Oct. 7, 1969 DE LOSS J. TANNER 3,471,640
TEMPERATURE COMPENSATED ELECTRON BEAM FOCUS CONTROL SYSTEM
Filed April 26, 1967
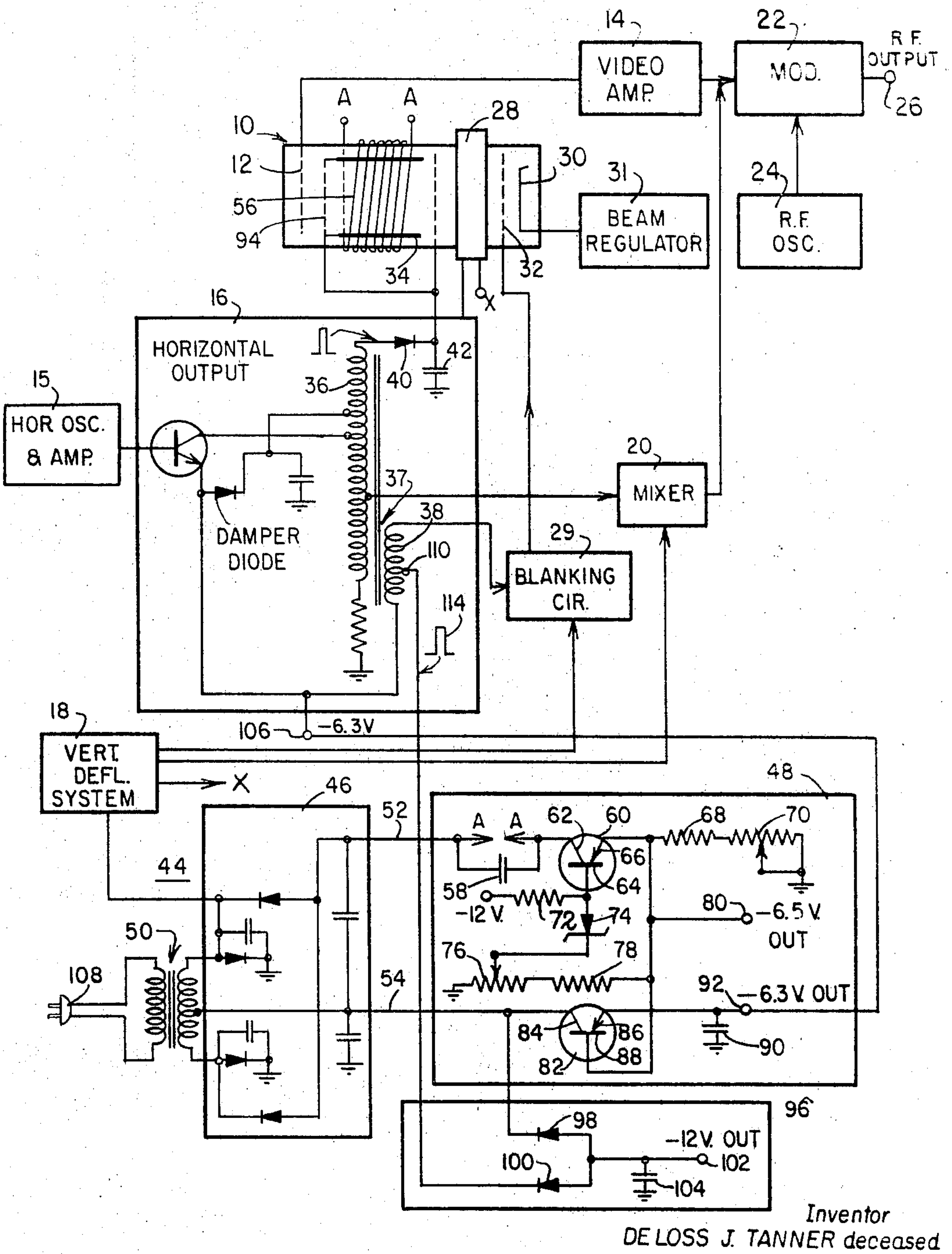
Inventor
DE LOSS J. TANNER deceased
by Arthur L. Hellyer, administrator.
By [signature]
Attys.

3,471,640
Patented Oct. 7, 1969

3,471,640

TEMPERATURE COMPENSATED ELECTRON BEAM FOCUS CONTROL SYSTEM

De Loss J. Tanner, deceased, late of Bensenville, Ill., by Arthur L. Hellyer, administrator, Wheaton, Ill., assignor to Motorola, Inc., Franklin Park, Ill., a corporation of Illinois

Filed Apr. 26, 1967, Ser. No. 635,643
Int. Cl. H04n *5/38*
U.S. Cl. 178—7.2 7 Claims

ABSTRACT OF THE DISCLOSURE

The system has a first circuit which includes the focus coil on an electromagnetic camera and a second circuit for supplying the focus electrode voltage. These circuits are responsive to a given change in temperature to change the coil current and the electrode voltage according to a fixed relationship to maintain the camera focussed.

Pick-up tubes or cameras utilized today in television camera systems are generally of an electrostatic type in which an electric field is applied to a focus electrode to properly focus the electron beam, or an electromagnetic type in which an electric field is applied to its focus electrode and a magnetic field is applied to its focus coil in order to maintain the beam properly focused. The latter type although requiring additional circuitry is cheaper to manufacture and for that reason such a tube may be desirable in many applications. It is known that the focus coil characteristics and the circuits applying the signals to the focus coil and the focus electrode are subject to changes with temperature variations which serve to degrade the focus. In addition, the A.C. line voltage may change from time to time as does the derived rectified DC voltage so as to further deteriorate the television signal. Thus, it is desirable to temperature regulate the circuits which generate the focus coil current and the focus electrode voltage and, in addition, to provide a regulated voltage supply for the remainder of the camera circuits. Additional considerations which are especially significant in developing a consumer camera adapted for home use are cost and size. To these ends, manufacturers of consumer cameras have generally provided no temperature compensation. As for the larger, less price sensitive industrial cameras and studio cameras, temperature regulation is provided by temperature sensitive elements such as stabistor diodes, thermistors or the like in the power supply system. These elements are provided to maintain the focus electrode voltage and the focus coil current constant with temperature variations.

It is, therefore, an object of this invention to provide a television camera system with improved focus control.

Another object of the invention is to provide a vidicon television tube with a simple, inexpensive circuit for automatic readjustment of electron beam focus as a function of changes in temperature.

Another object is to provide a power supply for generating a DC voltage which does not vary with line voltage changes but does vary with temperature changes in predetermined relationship with changes in the focus coil current.

Another object is to provide a regulator circuit for an electromagnetic type pick-up tube which maintains the focus coil current and the focus electrode voltage in a fixed predetermined relationship.

Another object is to provide a regulator circuit which maintains the current through the focus coil independent of line voltage changes and independent of changes in the focus coil characteristics due to temperature variations.

In brief, an electromagnetic type television camera with a focus electrode and a focus coil generally has characeristics such that if changes in the focus coil current and changes in the focus electrode voltage are maintained in a fixed predetermined relationship, the electron beam generated by the camera will remain substantially in focus. To maintain the beam properly focused with temperature changes, a pair of circuits are utilized one of which has the focus coil connected therein in such a manner that a given change in temperature will cause a given change in current through the coil. The other of the circuits, which may include a portion of the first circuit, supplies the focus electrode voltage in such a manner that said given temperature change causes a given change in the focus electrode voltage. The change in focus coil current and the change in focus electrode voltage has the required fixed predetermined relationship with one another to maintain the beam in focus.

More specifically, a pair of transisors are connected such that their base-to-emitter junctions are in series, the base of the first transistor being supplied from a constant voltage source which is relatively independent of temperature. The emitter of the other transistor supplies a DC voltage for the high voltage circuit which in turn develops the focus electrode voltage. The current through the focus coil, which is connected to the collector of the first transistor is proportional to the voltage across a base-to-emitter junction so that a change in temperature which causes a change in the base-to-emitter voltage effects a proportional change in the focus coil current. A voltage developed at the emitter of the second transistor is proportional to the drop across two base-to-emitter junctions so that a change in temperature causes the focus coil current to change by a given amount and the focus electrode voltage to change by twice that given amount. The camera tube characteristics are such that if this 1:2 relationship is maintained the electron beam remains in focus independent of changes in temperature.

The drawing illustrates a television camera system partly schematic and partly in block which incorporates the invention.

Referring now to FIG. 1, there is illustrated a television camera system incorporating the features of this invention. The vidicon tube 10 has a light sensitive target 12 the resistance of which varies inversely with the amount of light falling on it. The target is coupled to a video amplifier 14. Horizontal sweep signals are developed by horizontal oscillator and amplifier 15 and processed in horizontal output circuit 16. Vertical sweep signals developed by vertical deflection system 18 along with the horizontal signals are coupled to mixer 20 which inserts the horizontal and vertical blanking and synchronizing pulses in the video signal at the output of video amplifier 14. The composite video signal is then applied to modulator 22 which cooperates with RF oscillator 24 to develop an RF output at terminal 26. Horizontal and vertical sweep signals are applied from their respective systems to the horizontal and vertical yokes represented by block 28 in order to scan the electron beam generated by the cathode 30 across target 12. Further signals from deflection systems 16 and 18 are processed in the blanking circuits 29 and applied to control grid 32 for blanking the electron beam during retrace time. Beam regulator 31 is coupled to cathode 30 and provides means for automatically controlling the electron beam current.

The tube for which this invention is useful is an electromagnetic type wherein a relatively high DC voltage must be developed and applied to focus electrode 34 with a target mesh 94 on the end thereof in order to provide electrostatic focus while a current must be developed and translated through focus coil 56 wound around vidicon 10 to provide magnetic electron beam focus.

Power supply 44 comprises a power transformer 50 to which an AC line voltage is applied, a bridge rectifier circuit 46 which develops a pair of DC voltages from the AC signal across the secondary winding of transformer 50, and a regulator circuit 48 which generates three regulated DC voltages on terminals 80, 92 and 102 for various circuits in the television camera system. Regulator circuit 48 forms the substance of this invention and will be explained in detail subsequently.

It will be noted that several of the DC voltages utilized in the circuit of FIG. 1 have numerical values labeled on the drawing. It will be appreciated that these values are merely for illustration purposes and voltages of different magnitudes may be employed and still come within the scope of this invention. Bridge rectifier circuit 46 comprising four diodes and two filter capacitors is known and, therefore, further explanation is believed to be unnecessary. The rectifier circuit 46 develops DC voltages of −20 and −10 volts on leads 52 and 54 respectively which are utilized in regulator circuit 48.

Referring now more particularly to the operation of the regulator circuit 48, emitter 66 of PNP transistor 60 is connected to a point of reference potential such as ground through resistor 68 and variable resistor 70. In order to derive −6.5 volts DC on emitter 66 of transistor 60 and at terminal 80, it is necessary to provide −6.7 volts on base 64 due to the .2 volt drop across the base-to-emitter junction of a PNP transistor. It is further desirable that this −6.7 volt source be constant with changes in line voltage and relatively independent of changes in temperature. This may be done by employing a 6.7 volt Zener diode from base 64 to ground and supplying the anode thereof with a minus voltage. However, Zeners are commercially available only in fixed values such as a 5.6 volt type. Since a 6.7 volt Zener is not a commercial item and thus available only at an increase in cost, a 5.6 volt Zener is connected from base 64 of transistor 60 to the movable arm of variable resistor 76. The −6.5 volts on emitter 66 is applied to a voltage divider network comprising variable resistor 76 and resistor 78 to ground. The movable arm is set so that approximately −1.1 volts is present on the Zener cathode. A −12 volts from terminal 102, the development of which will be explained subsequently, supplies current for the Zener 74 through a resistor 72 connected to the Zener anode to cause −6.7 volts to be developed at base 64 (−5.6−1.1=−6.7). Thus since the base is clamped at −6.7, the emitter 66 is clamped at .2 volt more positive or at −6.5 volts.

The focus coil 56 provides means to supply −20 volts from lead 52 to collector 62 of transistor 60. Capacitor 58 coupled thereacross is used to limit high frequency oscillations which may occur. By merely adjusting variable resistor 70, any desired current may be allowed to flow through the collector-to-emitter junction of transistor 60 thereby determining the magnitude of current flowing through focus coil 56. Since resistor 70 alone determines the amount of focus coil current, if, for example, the line voltage drops so that there is a proportional voltage decrease on lead 52, the current will remain unaffected due to the corresponding drop on collector 62 of transistor 60.

Emitter 66 of transistor 60 is DC coupled to base 88 of PNP transistor 82 and lead 54 is connected to collector 84 to supply −10 volts DC thereto. Since transistor 82 is a PNP type, there is a .2 volt drop across the base-to-emitter junction and −6.3 volts is available on emitter 86 and at terminal 92. If the voltage on lead 54 changes, the voltage at terminal 92 would remain at −6.3 because the voltage on base 88 is at a constant −6.5 volts and the base-to-emitter drop of .2 is also constant. Bias for amplifying devices in horizontal output circuit 16 is coupled from terminal 92 to input terminal 106. Voltage for focus electrode 34 is developed by coupling horizontal pulses from horizontal deflection system 16 to a high voltage circuit comprising the primary winding 36 of a transformer 37, a diode 40 to rectify the pulses and capacitor 42 for filter purposes in order to provide a ripple-free DC voltage.

The type of vidicon used is one having parameters or characteristics such that if the focus coil current increased by a given amount and the focus electrode voltage increased by double that amount, the electron beam would remain in focus and similarly if the focus current decreased by a given amount and the voltage focus decreased by double that amount, again, the beam would remain focused. A nominal focus coil current and a nominal focus electrode voltage are established at room temperature. When the temperature changes, regulator circuit 48 serves to maintain the focus coil current and the focus electrode voltage in this fixed relationship. It is to be appreciated a tube with a relationship other than 1:2 could be utilized by providing a regulation circuit which is slightly modified from that shown.

When there is, for example, an increase in the temperature, the voltage on base 64 remains relatively unaffected because the voltages across a Zener is constant with temperature changes. However, the base-to-emitter drop will decrease from .2 volt at room temperature to, say, .1 volt so that −6.6 volts are present on emitter 66 and the current through the focus coil will increase correspondingly due to the increased drop across resistors 68 and 70. The fact that the resistance of focus coil 56 increases with temperature does not affect the current therethrough because, as stated before, resistors 68 and 70 along with the voltage drop across them determine the current. The increased resistance of focus coil 56 will be compensated for by a corresponding decrease in the voltage at collector 62. Since transistor 82 is a PNP type, there is a .2 volt drop at room temperature across its base-to-emitter junction and therefore −6.3 volts are available on emitter 86 and on terminal 92 at nominal temperature. If the temperature increases, −6.6 volts appear on base 88 and −6.5 volts on emitter 86 due to the .1 volt base-to-emitter drop.

Terminal 92 provides bias for amplifying devices in horizontal output circuit 16 which in turn provides high voltage for focus electrode 34 as explained previously. Thus, any change in the voltage on terminal 92 would be reflected as a proportional change in the focus electrode voltage. Now, when the temperature increases there is an increase in focus coil current determined solely by the voltage drop across a single base-to-emitter junction while the change in focus electrode voltage is determined by two base-to-emitter junctions connected in series. Thus, the change in focus electrode voltage is twice the change in focus coil current for any given temperature change. Thus, the relationship of focus coil current and focus electrode voltage corresponds to the requirements of the vidicon tube 10 to maintain the electron beam in proper focus with variations in temperature. It is important to note that whereas the prior circuits have components to keep the focus electrode voltage and focus coil current constant with temperature changes, the circuit herein described allows them to vary therewith but in a predetermined relationship according to the characteristics of the vidicon tube.

Starting system 96 provides means to start regulator circuit 48. When the camera is turned on, −10 volts are available on lead 54 which is applied to the cathode of diode 98 to forward bias the same and cause −10 volts to appear on lead 102. The −10 volts are coupled to resistor 72 to provide bias for Zener diode 74 to thereby start the regulator system 48 and develop −6.3 volts at terminal 92. Horizontal output circuit 16 is biased by −6.3 volts applied to terminal 106 to cause a pulse to appear across secondary winding 38 of a transformer 37, which is coupled to the cathode of diode 100. The pulse being more negative than −10 volts forward biases the diode so that −12 volts appear on terminal 102 which in turn reverse biases diode 98. The −12 volts are filtered by capacitor 104 and applied to resistor 72 to thereby cause the regulator circuit 48 to maintain operation. The −12 volts on terminal 102 is a regulated voltage and therefore is a useful biasing source for other circuits in the television camera system.

Several additional points are of interest. A low power, relatively inexpensive Zener diode is all that is required without sacrificing stabilization for two reasons. First, the only current that Zener diode 74 need supply is to the base 64 of transistor 60 which, due to current gain, is only a fraction of the current necessary for the focus coil. Secondly, a regulated voltage for base 88 of transistor 82 is provided by emitter 66 which supplies the needed base current for transistor 82, so that the Zener does not have to supply current for this stage.

Also, this method of temperature compensation does not affect the voltage regulation capabilities of the circuit because the voltages on emitters 66 and 86 of transistors 60 and 82, respectively, are maintained constant independent of changes in the line voltage as explained previously. Since the horizontal pulses applied to diode 100 are influeneced by the 6.3 volts on terminal 92, the −12 volts on terminal 102 is also contant. The fact that these regulated voltages do change with temperature and are applied to other portions of the camera system where such changes are undesirable, is not significantly detrimental to the operation of the camera because of the small changes involved.

What has been described, therefore, is a regulator circuit for maintaining the electron beam of a vidicon in proper focus independent of temperature without the use of stabistor diodes or thermistors by utilizing changes in the focus coil current and focus electrode voltage rather than trying to eliminate them. This has been accomplished without deteriorating the regulator's function in developing DC voltages which are independent of changes in the line voltage.

What is claimed is:

1. In a television camera system the combination of; a camera having a focus coil and a focus electrode cooperating to control the focus of an electron beam generated by the camera, a horizontal deflection system for developing horizontal signals to sweep the electron beam, the camera having characteristics such that if a change in focus coil current has a predetermined relationship with a change in focus electrode voltage then the electron beam remains substantially in focus, a regulator circuit to compensate for degradation of the beam focus due to temperature variations, including first circuit means coupled to the focus coil for supplying current thereto and being responsive to a given change in temperature to cause a given current change therein, second circuit means including at least a portion of said first circuit means responsive to said given change in temperature to develop a DC potential which varies in said predetermined relationship with said current change, said hrorizontal deflection system being energized by said DC potential to develop the horizontal signals, a high voltage system coupled between said horizontal deflection system and said focus electrode to process the horizontal signals and to develop a DC voltage for said electrode, said given current change and the change in DC voltage having substantially said predetermined relationship with one another to thereby maintain said electron beam in focus.

2. The television camera system according to claim 1, said predetermined relationship required to maintain said electron beam focused being an electrode voltage change equal to twice the coil current changes, said first circuit means comprising a first transistor having a first base, a first emitter and a first base-to-emitter junction, impedance means connected to said emitter for determining the amount of current through said focus coil, and a biasing circuit connected to said first base to establish a DC reference potential thereon which is substantially independent of temperature so that any changes in the base-to-emitter voltage due to temperature changes is reflected solely across said impedance means to thereby vary the current through said focus coil in proportion thereto, said second circuit means comprising said first base-to-emitter junction and a second transistor having a second base, second emitter and second base-to-emitter junction, said first emitter being coupled to said second base, said first and second base-to-emitter junctions being in series so that the change in said DC potential at said second emitter is proportional to twice the voltage change across a base-to-emitter junction.

3. The television camera system according to claim 2, said impedance means comprising variable resistance means to control the amount of current flowing through said focus coil.

4. The television camera system according to claim 2, said biasing circuit comprising a Zener diode and means coupled thereto to develop said DC reference potential.

5. The television camera system according to claim 2, said biasing circuit comprising a Zener diode having a cathode and an anode, means coupled to said anode to bias said Zener and means coupled from said first emitter to said cathode to establish the voltage across said Zener at its operating potential and to establish said DC reference potential on said first base.

6. The television camera system according to claim 1, further having supply means to provide an unregulated DC voltage, said regulator circuit being responsive thereto for causing said temperature sensitive control potential to be independent of changes in said DC voltage, a starting system coupled to said supply means and responsive to said unregulated DC voltage to develop a starting voltage for said regulator circuit, said starting system including means coupled to said horizontal system and responsive to said horizontal signals to develop a regulated maintaining voltage for said regulator circuit.

7. In a television camera system the combination of a camera having a focus coil and a focus electrode cooperating to control the focus of an electron beam generated by the camera, the camera having characteristics such that if a change in the focus coil current has a predetermined relationship with a change in the focus electrode voltage then the electron beam remains substantially in focus, a regulator circuit to compensate for degradation of the beam focus due to temperature variations including, first circuit means coupled to the focus coil for supplying current thereto and being responsive to a given change in temperature to cause a given current change therein, and second circuit means including at least a portion of said first circuit means coupled to the focus electrode for supplying a DC voltage thereto and being responsive to said given change in temperature to cause a given voltage change which varies in said predetermined relationship with said current change to thereby maintain said electron beam substantially in focus, said first and second circuit means including a plurality of transistors having respective base-to-emitter junctions with the voltage across each being temperature dependent, said focus coil coupled to the first of said transistors so that the percentage change in current therethrough is proportional to the voltage across its base-to-emitter junction, said base-to-emitter junctions being serially connected, means coupling the emitter of the last of said transistors to said focus electrode, the percentage change in voltage on said focus electrode being proportional to the number of transistors times the voltage across any base-to-emitter junction, said percentage change in current and said percentage change in voltage having approximately said predetermined relationship with one another.

References Cited

UNITED STATES PATENTS

| | | | |
|---|---|---|---|
| 2,390,042 | 5/1960 | Fathauer | 315—31 |
| 2,942,148 | 6/1960 | Fathauer et al. | 315—31 |
| 3,355,621 | 11/1967 | Cosgrove | 315—31 |

OTHER REFERENCES

Silicon Zener Diode and Rectifier Handbook—Motorola, pp.17–18, 2nd edition (1961).

RICHARD MURRAY, Primary Examiner

ROBERT L. RICHARDSON, Assistant Examiner

U.S. Cl. X.R.

315—31